United States Patent [19]

St. Clair

[11] Patent Number: 4,813,394

[45] Date of Patent: Mar. 21, 1989

[54] CARBURETION SYSTEMS

[76] Inventor: Christie C. St. Clair, 95 Beerescourt Rd., Hamilton, New Zealand

[21] Appl. No.: 47,652

[22] Filed: May 8, 1987

[30] Foreign Application Priority Data

Jun. 3, 1986 [NZ] New Zealand .......... 216400

[51] Int. Cl.$^4$ .......... F02B 43/00
[52] U.S. Cl. .......... 123/527; 123/27 GE; 48/189.1
[58] Field of Search .......... 123/527, 27 GE; 48/189.1, 180.1

[56] References Cited

U.S. PATENT DOCUMENTS

| | | | |
|---|---|---|---|
| 2,563,228 | 8/1951 | Ensign | 123/527 |
| 2,815,018 | 12/1957 | McClain | 123/527 |
| 2,872,999 | 2/1959 | Botto | 123/527 |
| 2,896,599 | 7/1959 | Ensign | 123/527 |
| 3,068,086 | 12/1962 | Ensign et al. | 123/527 |
| 3,931,798 | 1/1976 | Hoogeboom | 123/527 |
| 4,152,121 | 5/1979 | Van Der Weide et al. | 123/527 |
| 4,453,523 | 6/1984 | Poehlman | 123/527 |
| 4,526,155 | 7/1985 | Van Den Wildenberg et al. | 123/527 |
| 4,541,397 | 9/1985 | Young | 123/527 |

*Primary Examiner*—E. Rollins Cross
*Attorney, Agent, or Firm*—Glen R. Grunewald; Thomas R. Lampe

[57] ABSTRACT

A carburetion system to adapt a motor vehicle to use either liquid gasoline fuel or compressed hydrocarbon gas fuel including a diaphragm operated valve to control the flow of hydrocarbon gas to the motor where one side of the diaphragm is connected to the partial vacuum arising from induction flow of fuel to vary the opening of the valve proportional with the required fuel supply to the motor.

11 Claims, 2 Drawing Sheets

CARBURETION SYSTEMS

This invention concerns carburetion systems for vehicles whose motors accept petrol or alternative fuel such as CNG.

Conversions of petrol carburetion systems to accept CNG give rise to modification problems. Known systems exhibit some or all of the three main drawbacks. Firstly, the provision of a second venturi for the CNG reduces the overall gas flow into the motor. Secondly it is not easy to obtain a sufficiently rich fuel/air raito over the range of gas flow. Thirdly, modification disturbs the carburettor balance so that performance when running on petrol is spoiled.

This invention provides a carburetion device for a vehicle which comprises a diaphragm actuated valve capable of controlling the flow of gas from the low pressure supply to the vehicle motor induction, and means to both sense the partial vacuum arising from induction flow and actuate the diaphragm such that the pressure of the gas supply varies proportionately to the partial vacuum.

Figure 1:
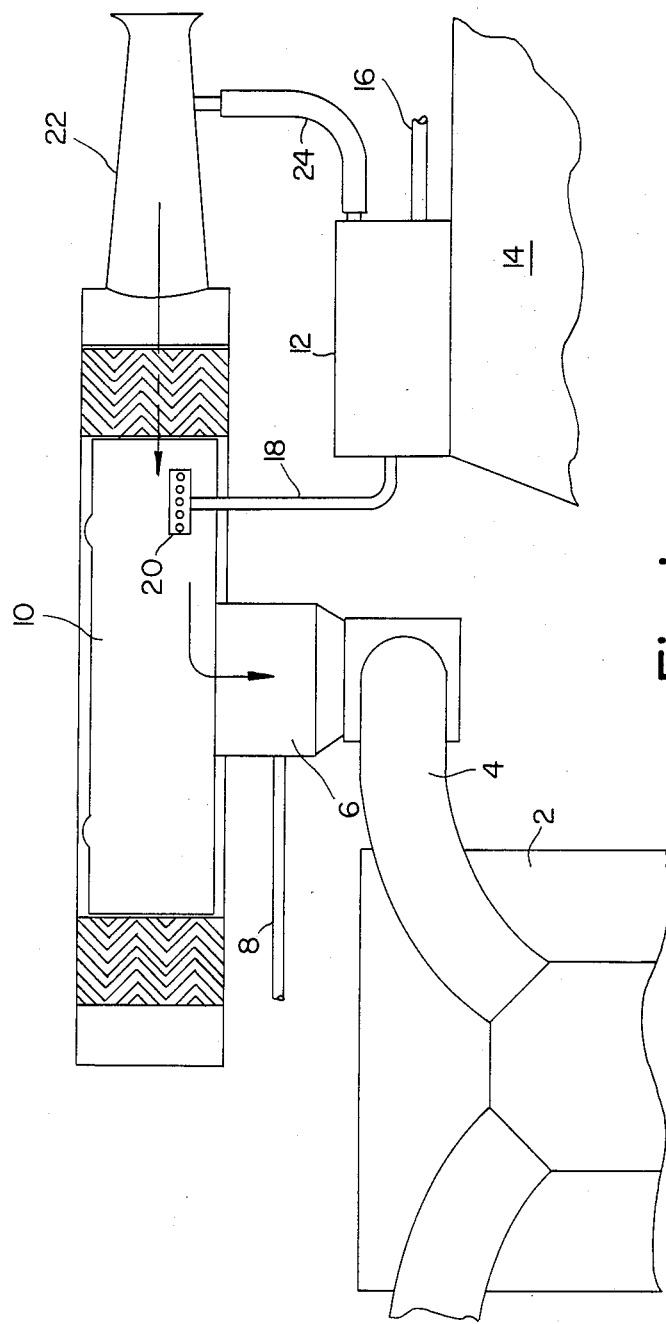
Figure 2:
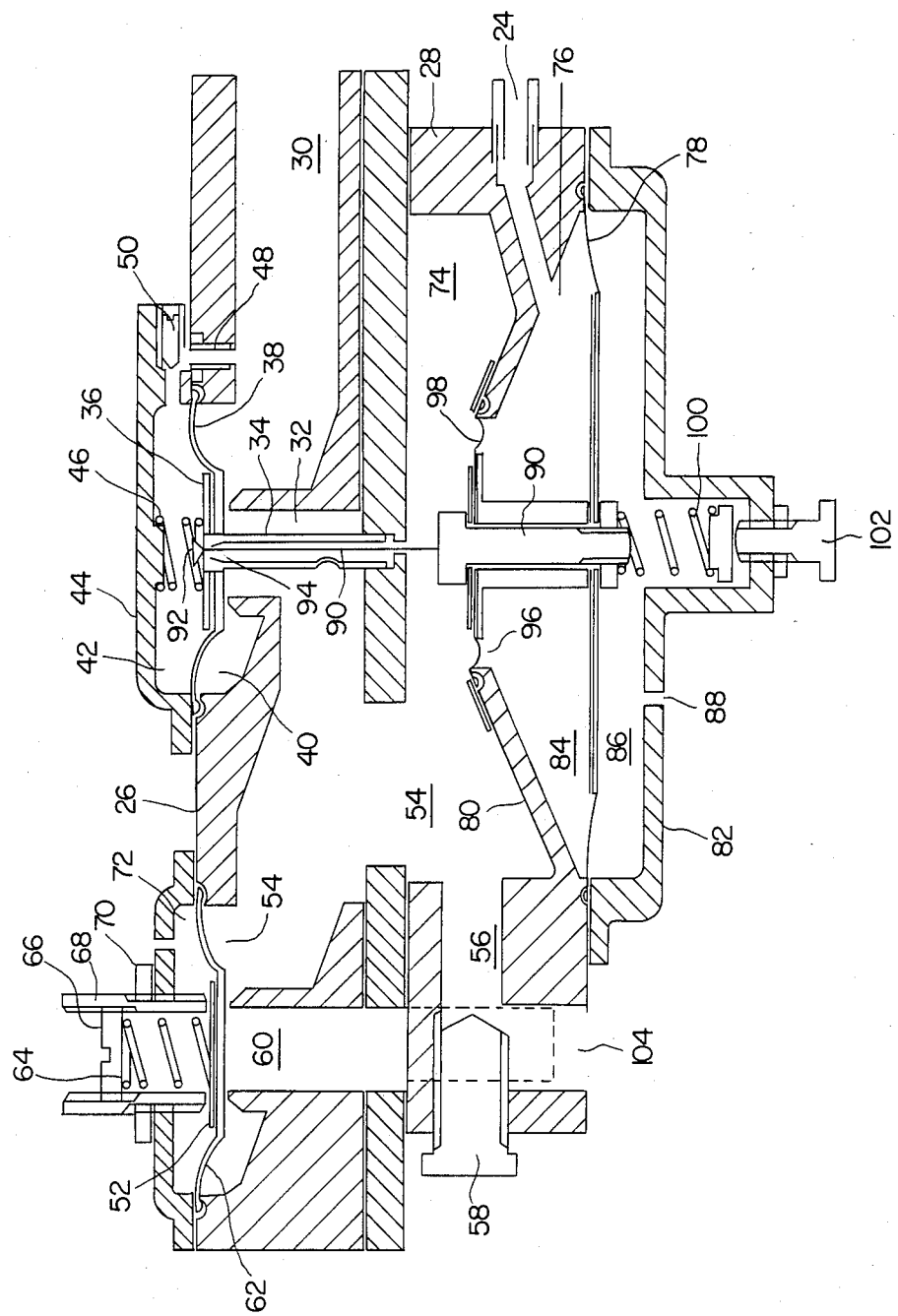

One embodiment of the invention is now described by way of example with reference to the accompanying drawings in which FIG. 1 is a diagrammatic section of the device in the engine compartment of a vehicle FIG. 2 is a sectional elevation of the device.

Referring now to FIG. 1, the engine block 2 has an inlet manifold 4 to which carburettor 6 is bolted. The petrol supply pipe 8 and air filter 10 are preserved without modification to their positions allowing the vehicle to run on petrol if desired. The carburetion device 12 is secured to the bulk head 14 of the engine compartment and is supplied from a gas bottle (not shown) in the vehicle by gas supply pipe 16. A gas outlet 18 supplies gas from the device to a distributing head 20 within the air filter body. The flow of fuel gas through the carburetion device is controlled by the vacuum set up under running conditions in the venturi 22 of the air filter. The vacuum level is sensed by tube 24 which opens into the venturi close to the mouth thereof.

Referring now to FIG. 2 the carburetion device includes an upper die cast body 26 and a lower die cast body 28 which are bolted together. The upper die cast body has a gas inlet passage 30 which receives gas supply pipe 16 from a regulator (not shown). The gas inlet 30 leads to a central upstanding valve passage 32 which accomodates the stem 34 of a diaphragm valve 36 the diaphragm 38 of which is located across an aperture 40 in the upper die cast body and a compensating compartment 42 is created above the aperture by a cap 44. The cap 44 locates a return spring 46 which bears upon the end of the valve 36. The compensating compartment 42 is connected to the gas inlet 30 by a bypass bleed 48. The flow through the bypass is controlled by a screw throttle 50 in the cap.

The upper die cast body 26 contains an auxiliary diaphragm valve 52 for a purpose to be described later. The upper die cast body 26 has an aperture 54 which leads into the interior of the lower hollow die cast body 28 and to an outlet 56 the size of which is controlled by a screw throttle 58. The auxiliary valve also has an upright gas passage 60 which acts as an auxiliary outlet from the device at high speeds when the flow past the screw adjuster 58 would be insufficient. The passage 60 is closed by a diaphragm 62 which underlies the valve 52. Valve 52 is urged shut by spring 64 and screw adjuster 66. The extent to which the valve opens is set by barrel 68 and locking ring 70. The compensating compartment 72 is open to atmosphere.

The lower part of the hollow lower die cast body 28 is divided into a hollow interior 74 and the chamber 76 which houses a sensor diaphragm 78. The sensor diaphragm 78 is nipped between a conical wall 80 and a cap 82. The diaphragm divides the chamber into an upper compartment 84 which is connected to induction pressure by passage 24 and a lower compartment 86 which is connected to atmosphere by a bore 88. The diaphragm is connected to a stem 90 which passes through the hollow valve stem 34 of the main diaphragm valve and terminates in a conical pilot valve 92 which opens and closes a port 94 in the valve in order to exert a servo action which assists in opening and closing the main valve.

The conical wall has a mouth 96 which is closed by a damper diaphragm 98. The stem is supported in the position shown by return spring 100 and an adjuster 102 which is adjusted so that the pilot valve is closed but the slightest upward force on the sensor diaphragm will begin to open the pilot valve and therefore start to open the main diaphragm valve.

OPERATION OF THE PILOT VALVE AND MAIN VALVE

The speed of response of the main diaphragm valve is controlled by the servo effect of the pilot valve 92. Fuel gas enters the gas inlet 30 from the pressure regulator (not shown) and the shut off solenoid valve (not shown). Gas pressure acts on the bottom of the diaphragm valve 36, the bypass bleed 48 and also at the top of the diaphragm valve. Under engine idle conditions the pilot valve 92 is closed. The spring 46 exerts a light pressure to bias the diaphragm valve closed. When the sensor diaphragm 78 lifts in response to an increase in induction vacuum the gas pressure above the diaphragm valve 36 is allowed to escape, the pressure on the under side of the diaphragm 38 causes the latter to lift allowing the main gas supply to flow. As the diaphragm 38 rises it approaches the pilot valve 92 and reduces the gas flow through the pilot and pressure increases on the upper side of the diaphragm 38 until a stage is reached where the escape of the gas through the pilot port 94 matches the flow through the bypass bleed 48. Any subsequent movement of the pilot will result in a corresponding movement of the diaphragm. If the pilot valve 92 descends, pressure on the upper side of the diaphragm 38 will increase and the diaphragm will descend. Conversely if the pilot ascends 92 the pressure on the upper side of the diaphragm 38 will decrease and the diaphragm will ascend therefore the pilot valve 92 and the main valve 36 move in unison as though they were physically joined.

IDLING OPERATION

An idle bypass (not shown) connected between the fuel gas inlet 30 and the chamber interior 54. When the engine is cranked, a solenoid valve (not shown) opens to apply a priming charge to the gas inlet. The diaphragm valve 36, 52 are closed so only the priming charge bypasses the main diaphragm valve 36 and reaches the manifold 4 so that the engine can start and run at idle speed. As the engine throttle starts to open, induction vacuum occurs at the air filter venturi 22 which reaches the vacuum chamber via tube 24 (FIG. 1). Partial vacuum is also applied across the damper diaphragm 98 but because the sensor diaphragm 78 is larger than the damper diaphragm the net result is an upward force on the stem 90 which opens the pilot valve 92. In turn the main diaphragm valve 36 opens increasing the gas flow to the engine. Increased gas flow causes a rise in pressure in the gas outlet 56 which exerts a downward force on the damper diaphragm 98 opposing the upward force produced by the venturi and prevents the sensor diaphragm 78 rising further.

With still further throttle opening the partial vacuum across the sensor diaphragm 98 increases and the stem 90 rises further until the pressure on the damper diaphragm again increases so that the downward force equals the upward force and the main diaphragm valve 36 opens no further. The damper diaphragm 98 is smaller in area than the sensor diaphragm. The pressure required to oppose the partial vacuum is greater than the partial vacuum but proportional to it, the relative pressures being determined by the relative diameters of the diaphragms 78, 98.

The gas flow to the engine produced by the fuel gas pressure in the outlet is determined by the setting of the adjuster 58 which controls the flow of fuel gas over the whole speed range of the engine. The fuel/air ratio is maintained over the range by dependence upon sensing induction vacuum at the air filter venturi. If the air filter 10 is of the type which has no venturi then one must be fitted and where the device is supplied as a kit the venturi will be supplied to suitably convert the air filter.

THEORY OF OPERATION

The induction vacuum produced by the venturi is proportional to the square of the velocity through the venturi. Therefore if the velocity through the venturi is doubled the partial vacuum increases fourfold. Conversely the flow through orifice is proportional to the square root of the pressure across the orifice. Thus if the pressure across the orifice is increased fourfold the flow is doubled. If the throttle is opened so that air flow to the engine is doubled, the partial vacuum increases fourfold causing the gas pressure to increase fourfold which produces a doubling of the gas flow and so the fuel/air ratio remains constant.

In a reciprocating engine the air flow to the engine is not a steady flow but is a pulsating flow, the pulsations being most marked at wide open throttle and relatively low engine rpm. As engine speed increases the pulses diminish and under cruise conditions with the throttle partially closed the air flow is almost steady. Under pulsating flow, the average partial vacuum produced by a venturi is greater than for an equivalent steady flow which results in this device providing a richer fuel/air mixture at lower engine speeds than at high engine speeds so if the mixture is correctly adjusted at low speeds it will be too lean at high speeds. To compensate for this effect an enrichment device in the form of the auxiliary diaphragm valve 52 is provided.

OPERATION OF AUXILIARY DIAPHRAGM VALVE

As the air flow to the engine increases the gas pressure in the gas outlet 56 increases. The auxiliary diaphragm 52 is held on its seat by the spring 64 which is adjustable by the screw 66. The limit of travel of the diaphragm is adjustable by the barrel stop 68. Starting with spring released and the barrel stop screwed down and the vehicle is mounted on a dynomometer, the main gas flow is set by adjusting (main) screw 58 to give the correct fuel/air mixture at wide open throttle and low engine revs (say 2000 rpm). The engine is then run at wide open throttle and high speed say 4000-5000 rpm and the barrel stop 68 is unscrewed to again provide the correct fuel/air mixture. Spring 64 is then tensioned by screwing in the screw 66 within the barrel stop. Starting again at 2000 rpm the engine speed is progressively increased until the fuel/air mixture starts to become too lean, at which point the adjuster screw is unscrewed again to provide correct fuel/air mixture. When the auxiliary diaphragm 52 is lifted, gas flows through the auxiliary gas passage 60 and joins the main gas stream to reach the air filter through pipe 18.

The fuel/air mixture is thus correctly set at three rpm values in the engine's range. Any variation from ideal between these values is small enough to be negligible. Since the above settings are made under wide open throttle they are set under varying pulsating air flow conditions. Under cruise conditions with the throttle butterfly partly closed the air flow is almost steady and the gas air mixture is leaner providing economical crusing.

What I claim is:

1. A carburetion device for a vehicle which comprises: a diaphragm-actuated valve capable of controlling the flow of gas from the low pressure supply to the vehicle motor induction, a sensor diaphragm which is funtionally linked to the valve such that a movement of the sensor diaphragm produces a corresponding movement in the valve, means to separate the gas supply inlet from the gas supply outlet, means to separate the gas supply passage on one side of the diaphragm from a compensating chamber on the opposite side of the diaphragm, a bypass bleed joining the passage with the compensating chamber and a pilot valve which is opened and closed by the sensor diaphragm in order to change the differential pressure on opposite sides of the diaphragm whereby the diaphragm valve openings are proportional to the level of induction vacuum.

2. A carburetion device as claimed in claim 1 wherein the area of the pilot valve port is approximately equal to the area of the bypass bleed.

3. A carburetion device as claimed in claim 1 wherein a damper attenuates the movements of the sensor diaphragm.

4. A carburetion device as claimed in claim 3 wherein the damper is a diphragm which is exposed to the prevailing pressure on the gas outlet and is operatively connected to the pilot valve.

5. A carburetion device as claimed in claim 1 wherein two gas outlets lead from the diaphragm actuated valve, the first of which is restricted by a diaphragm valve which opens only at high gas flows to enrich the total flow.

6. A carburetion device as claimed in claim 5 wherein the second gas outlet is subject to a manually adjustable flow control.

7. A carburetion device as claimed in claim 6 wherein the flow control is a screw throttle.

8. A carburetion device as claimed in claim 4 wherein both sensor diaphragm and damper diaphragm are connected to a common stem which carries the pilot valve.

9. A carburetion device as claimed in claim 8 wherein the sensor diaphragm divides an induction vacuum chamber into an actuating compartment which is connected to the induction vacuum and a compensating chamber connected to atmosphere, the stem which is actuated by the sensor diaphragm passing through the damper diaphragm which also closes the mouth of the actuating compartment.

10. A carburetion device as claimed in any one of claims 1 wherein the gas outlets terminate in a common passage which is adapted to enter the vehicle air cleaner.

11. A fuel conversion device for a vehicle comprising a carburetion device as claimed in claim 1, a fuel gas delivery head and connectors for fuel gas and induction vacuum.

* * * * *